United States Patent [19]
Brion

[11] 3,797,379
[45] Mar. 19, 1974

[54] BARBECUE MEAT HOLDER

[76] Inventor: Alison C. Brion, 4706 Sunnyside Rd., Minneapolis, Minn. 55424

[22] Filed: May 1, 1972

[21] Appl. No.: 249,129

[52] U.S. Cl. ............................... 99/421 H, 99/427
[51] Int. Cl. ......................................... A47j 37/04
[58] Field of Search ...... 99/421 H, 421 P, 426, 427, 99/447, 448, 449, 450, 339, 443 R, 443 C

[56] References Cited
UNITED STATES PATENTS

| | | | |
|---|---|---|---|
| 1,359,749 | 11/1920 | Schey | 99/427 |
| 2,985,096 | 5/1961 | Wolske | 99/421 P |
| 3,049,072 | 8/1962 | Smith | 99/427 |
| 3,084,618 | 4/1963 | Dieterich | 99/427 |
| 3,163,103 | 12/1964 | Shoup | 99/427 |
| 3,285,160 | 11/1966 | Smith | 99/427 |
| 3,333,529 | 8/1967 | Wilson | 99/339 |

FOREIGN PATENTS OR APPLICATIONS 634,546 11/1927 France .............................. 99/427

Primary Examiner—William I. Price
Assistant Examiner—Arthur O. Henderson
Attorney, Agent, or Firm—Stepno, Schwabb & Linn

[57] ABSTRACT

A barbecue meat holder having rotatable spaced hubs with aligning stub shafts secured thereto and groups of four co-planar spokes extending radially outwardly from each of said hubs together with four longitudinal clamping bars slidably mounted on the corresponding spokes of each group and secured at their ends to said spokes at various positions and removable therefrom.

2 Claims, 4 Drawing Figures

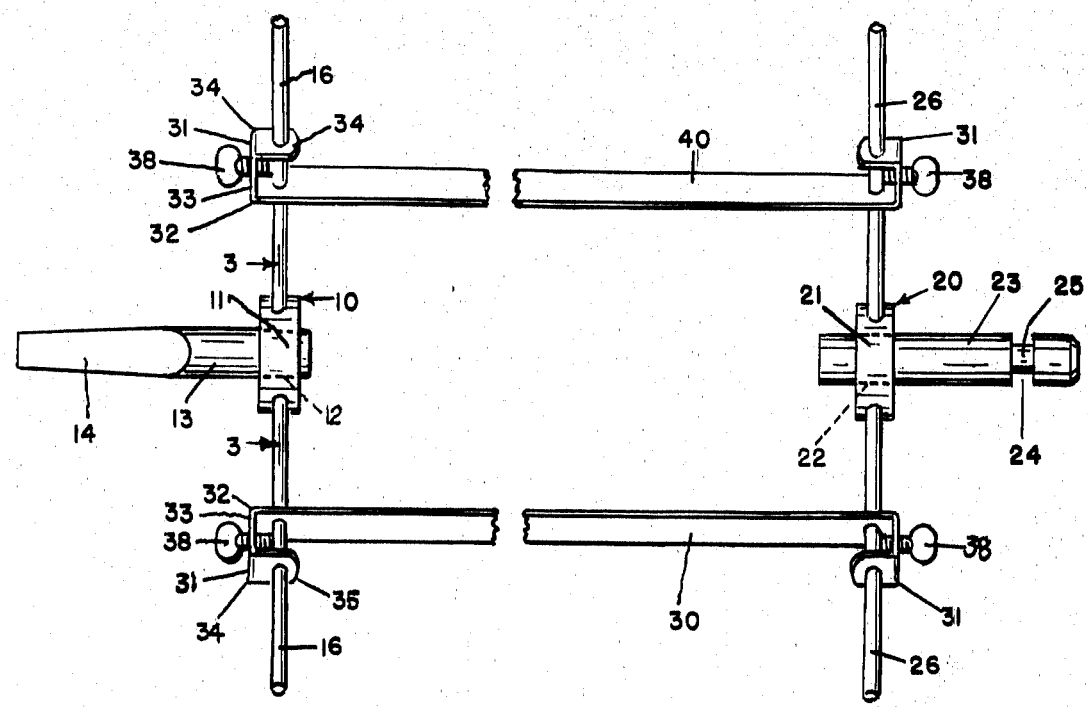
FIG. 2
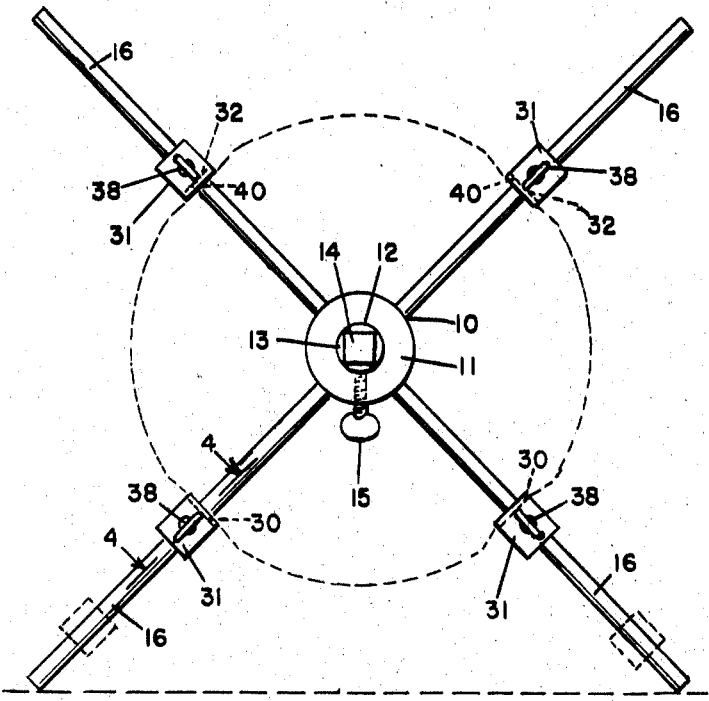
FIG. 1
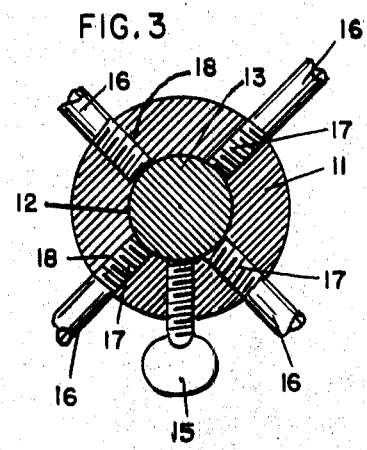
FIG. 4
FIG. 3

BARBECUE MEAT HOLDER

FIELD OF THE INVENTION

The invention relates to barbecue apparatus in which a spit or other pointed device is pressed into or driven through the meat and rotated above an open fire.

SUMMARY OF THE INVENTION

In the prior art using a spit or other pointed device for supporting the meat, the hot cooked meat must be handled to remove the spit or other device from the meat. With applicant's invention no spit or other device piercing the meat is required and the meat can be deposited intact on a platter without touching the meat by setting the meat holder on or above a platter and loosening and sliding the lowermost clamping bars to a lower position on the spokes.

In the drawings:

FIG. 1 is an end elevational view of the meat holder detached from a barbecue with which it would be used and viewed from the drive end thereof and showing the clamp bars in meat supporting position.

FIG. 2 is a side elevational view of the structure shown in FIG. 1 with the intermediate portion cut away to illustrate both ends of the meat holder.

FIG. 3 is fragmentary sectional view taken on line 3—3 of FIG. 2 and drawn to a greater scale than used in FIG. 2.

FIG. 4 is a fragmentary sectional view taken on line 4—4 of FIG. 1 and drawn to a greater scale than used in FIG. 1.

The invention comprises two rotatable spaced end members 10 and 20 connected together by lower clamp bars 30 and by means of upper clamp bars 40. The end members 10 and 20 have hubs 11 and 21 which are drilled to form bores 12 and 22, the hub 11 being shown in section in FIG. 3. In the bore 12 of this hub is inserted a stub shaft 13 which has a square tapering end 14 adapted to fit into a corresponding socket in the driving shaft of the barbecue with which the meat holder is to be used. A thumb screw 15 screwed into the hub 10 as shown in FIG. 3 holds the shaft 13 in adjusted position.

The hub 21 is similar to the hub 11 and supports a stub shaft 23 in the same manner as the stub shaft 13 is supported. This shaft has an annular groove 24 in the same which provides a journal 25 in it adapted to fit into a slotted bearing in the barbecue with which the meat holder is to be used.

Extending outwardly from the hub 10 are four spokes 16 whose axes lie in a plane at right angles to the axis of the stub shaft 13 and are equally angularly spaced with reference to one another. The inner ends 17 of these spokes are threaded to screw into threaded sockets 18 in the hub 11. Similar spokes 26 are similarly disposed and attached to the hub 21. These spokes each serve as guide means for guiding clamp bars 30 and 40 for radial movement toward and from the axis of the end members 10 and 20.

For guiding the bars 30 and 40 for sliding movement along the spokes 16 and 26 sliders 31 are formed at each end of the bars which are similar in construction. One of these sliders is shown in detail in FIG. 4 and is constructed as follows: The end of the bar 30 has a right angle bend 32 crosswise of the bar to provide a back 33 issuing at right angles to the bar. The back 33 also has a right angle bend 34 extending cross-wise of the same and providing a flange 35 spaced from and parallel to the bar. The bar 30 at its end is formed with a hole 36 which registers with a similar hole 37 in the flange 35. Spoke 16 passes through the holes 36 and 37 and bar 30 is guided for radial sliding movement along the spoke to which the slider is applied. The back 33 is drilled and tapped to receive a thumb screw 38 which when screwed against the spoke 16 serves as holding means for holding the end of the bar in position on the spoke on which the slider is disposed.

The method of using the invention is as follows: The spokes 16 besides adjustably supporting the clamp bars 30 and 40 also serve as feet for supporting the entire barbecue meat holder on a flat surface when loading or unloading the meat. To load the meat, the upper bars 40 are moved outwardly at least sufficiently to allow the meat to pass therebetween. The bars 30 are then moved upwardly until they support the meat coaxially with the shafts 13 and 23. The bars 40 are then lowered until they engage the meat. The meat holder is then mounted in the barbecue and rotated. Adjustment can then be made by shifting the sliders 31 until the meat is properly centered and balanced. The bars 30 and 40 are constructed of a somewhat resilient material so that said bars may bend and the openings 36 formed to accommodate such bending.

When the meat is to be removed the loaded meat holder is removed from the barbecue and set on a table or platter with any of the two adjoining pair of spokes 16 or 26 resting on said table or platter. The thumb screws 38 of the sliders 31 for the two lowermost clamp bars 30 are then unscrewed and the bars 30 slide downwardly along the spokes 16 and 26 spreading as they decend to widen the space therebetween to let the meat fall through said space and be deposited upon the platter or table without manual handling of the hot meat. The meat holder can then be removed.

If desired, the clamp bars may be completely removed from the end members to accommodate cleaning or storing.

I claim:

1. A barbecue meat holder comprising:
   first and second spaced end members each including a shaft having a hub mounted on one end thereof, said hub having a number of guide spokes in excess of two attached thereto and extending radially outwardly therefrom;
   a number of separate clamp bars in excess of two detached from each other and extending from the guide spokes of one end member to the guide spokes of the other to form an entrapping cage for the meat, said clamp bars interconnecting said end members such that the shafts thereof are disposed in axial alignment;
   each of said guide spokes selectively guiding a respective end of each of said clamp bars such that adjacent ones thereof move toward or away from each other as the same are independently moved toward or away from the shafts of the end members, respectively, said clamp bars being cooperatively movable for centering the weight of the meat relative to the shaft axis of the end members;
   holding means acting between said clamp bars and said end members for holding said clamp bars in adjusted positions; and a pair of adjacent guide spokes of each of said end members serving as feet for supporting the meat holder such that movement of said clamp bars away from the shaft axis of said end members opens said entrapping cage for releasing the meat contained therein.

2. A barbecue meat holder according to claim 1 in which:

a. the number of clamp bars are four and are separable from another, b. the guide spokes consist of four radially extending spokes at each end member along which the ends of the clamp bars may travel, c. said spokes at each end member forming substantially right angles with adjacent spokes, and d. the ends of two of the corresponding spokes of both of said end members forming feet for supporting the meat holder while loading and unloading the meat.

* * * * *